Dec. 25, 1956  J. H. T. MILLINGTON  2,775,069
SEALING MACHINE FOR TUBULAR LAMPS
Filed April 24, 1951  5 Sheets-Sheet 2

INVENTOR
J.H.T. MILLINGTON
BY
ATTORNEY

Dec. 25, 1956 J. H. T. MILLINGTON 2,775,069
SEALING MACHINE FOR TUBULAR LAMPS
Filed April 24, 1951 5 Sheets-Sheet 3

INVENTOR
J. H. T. MILLINGTON.
BY
ATTORNEY

Dec. 25, 1956  J. H. T. MILLINGTON  2,775,069
SEALING MACHINE FOR TUBULAR LAMPS
Filed April 24, 1951  5 Sheets-Sheet 5

INVENTOR
J. H. T. MILLINGTON.
BY
ATTORNEY

United States Patent Office 2,775,069
Patented Dec. 25, 1956

2,775,069

SEALING MACHINE FOR TUBULAR LAMPS

John H. T. Millington, Fairmont, W. Va., assignor to Westinghouse Electric Corporation, East Pittsburgh, Pa., a corporation of Pennsylvania Application April 24, 1951, Serial No. 222,648

11 Claims. (Cl. 49—2)

This invention relates to sealing mounts into tubular bulbs and, more particularly, to machines for tubular lamps such as those of the fluorescent type.

The principal object of my invention, generally considered, is to provide a machine to which tubular bulbs and mounts are fed, and which delivers such bulbs each with a mount sealed automatically to each end thereof.

Another object of my invention is to provide an automatic sealing machine for tubular lamps, which takes open ended tubular bulbs, and mounts as fed thereto, raises a mount to the bottom of each bulb, applies fires at the junction of the mount at the bottom of each bulb, while oscillating the burners about non-rotating bulbs and puddling the seals, separates the lead wires as required for subsequent exhaust operations, reverses the position of each bulb, one by one, by turning end for end, takes a mount for the then lower end of each reversed bulb, raises such a mount to the bottom of each bulb, seals said mounts and bulbs as before, and separates the lead wires of said mounts, allowing for then removing the assembled bulbs and mounts from the machine.

A further object of my invention is to provide an improved bulb holder, for a sealing machine as above described, which decreases the error in centralizing abnormal bulbs.

A still further object of my invention, is to provide a lamp sealing burner arrangement which moves in synchronism with the indexing of bulbs, stopping to allow such indexing and oscillating between indexing operations.

Other objects and advantages of the invention, relating to the particular arrangement and construction of the various parts, will become apparent as the description proceeds.

In the scale drawing:

Fig. 7 is a fragmentary side elevational view of the lower portion of the mount supporting fixture in engagement with its operating cam track at the time of a puddling operation;

Fig. 17 is a set of functional graphs.

The present invention is concerned with a machine for automatically sealing mounts into both ends of tubular bulbs for lamps, such as those of the fluorescent type, and the spreading apart of the lead wires of such mounts, so that such lamps will then be ready for exhaust operations. Use of a machine embodying my invention makes possible a performance of the necessary operations at greater speed and with less labor than has heretofore been possible, as well as reducing the equipment floor space and providing greater maintenance accessibility.

Briefly, the machine carries a non-rotating tubular bulb, held vertically, through a series of oscillating burners to seal the lower end to a mount, separates the lead wires of said mount, turns the bulb end for end, while still held in its fixture, and repeats the process at the opposite, and then lower, end of the bulb. Turning the bulb to a reversed upright position between sealing operations, makes possible the sealing of a mount always to the lower end of said bulb, thereby providing the best conditions for holding the mount.

The bulbs and mounts are carried by heads or fixtures and moved from station to station by two intermittently-advanced track-guided endless chains forming a conveyor. The following are a preferred sequence of operations. (1) Load a tubulated mount on its fixture while indexed at a station near one end of the machine, in this case the left hand end as viewed in Fig. 1. (2) At the next station a bulb is loaded on its fixture above said mount. (3) A cam track, over which the mount-holding fixture is drawn, causes the mount to rise to sealing position with respect to its bulb. (4) The bulb and its engaged mount pass through a series of sealing fires, at as many indexing stations, and a sealing operation therebetween takes place, while slight "hills" on the mount cam track effect "puddling" operations. (5) The lead wires are then separated from one another, as required for subsequent exhaust operations. (6) Rollers on the bulb-carrying fixture or head now engage a slot in a turning yoke at the end of the machine, the guide rods of said fixture drop, disengaging the bulb-supporting slat, and the yoke revolves, turning the bulb end for end to reversed vertical position, one bulb being turned one way and the next bulb the other way. (7) The guide rods now rise, locking the slat in reversed upright position. (8) An untubulated mount is loaded on its fixture, while indexed at a station near the end at which the bulb was turned, but at the other side of the machine. (9) This mount is, in a manner similar to the raising of the tubulated mount, caused to engage the lower end of the bulb, the upper end of which has been sealed to a tubulated mount. (10) The bulb and its untubulated mount pass through a series of sealing fires and are united, as for the tubulated mount.

(11) The lead wires of said second mount are separated from one another. (12) The bulb with two mounts sealed thereto, is unloaded from the machine.

*Detailed description of machine frame, housing and conveyor*

Figures 1, 6, 18:
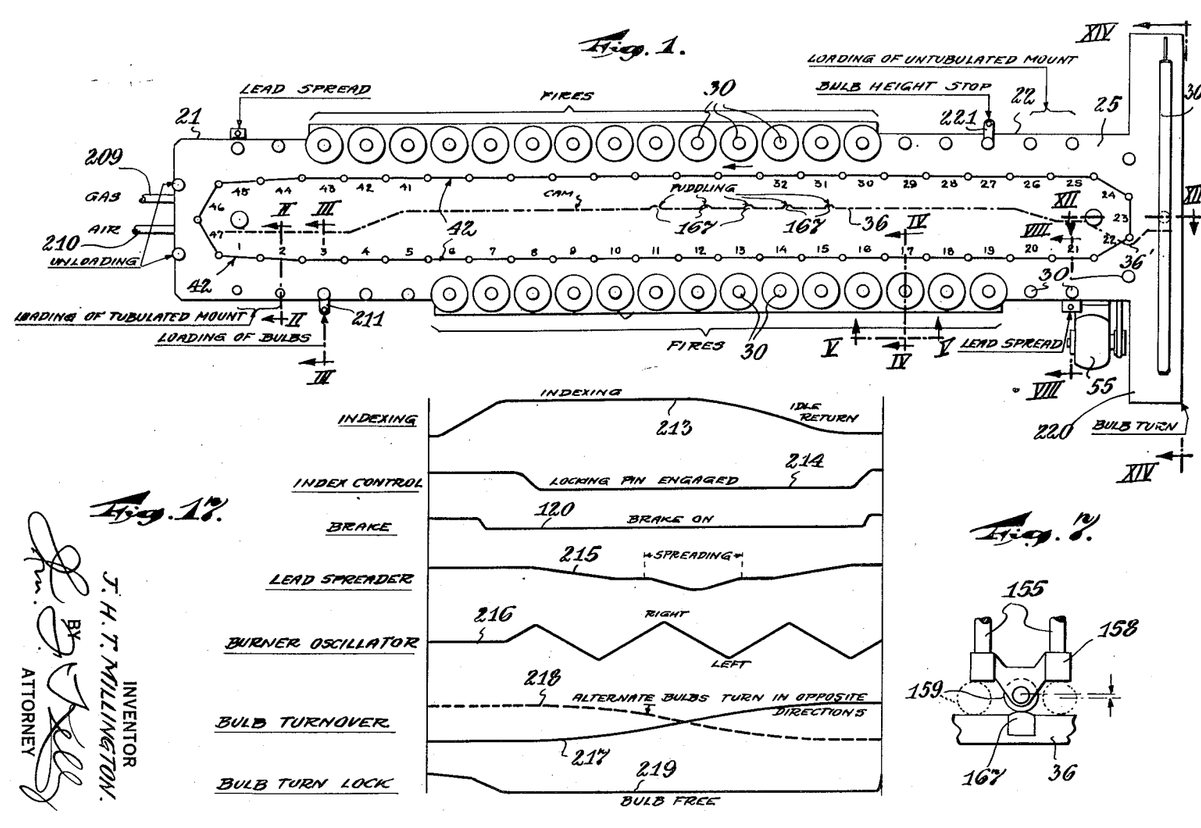
Fig. 1 is a diagrammatic plan of apparatus embodying my invention.
Fig. 6 is a fragmentary sectional view on the line VI—VI of Fig. 4 in the direction of the arrows.
Figure 2:
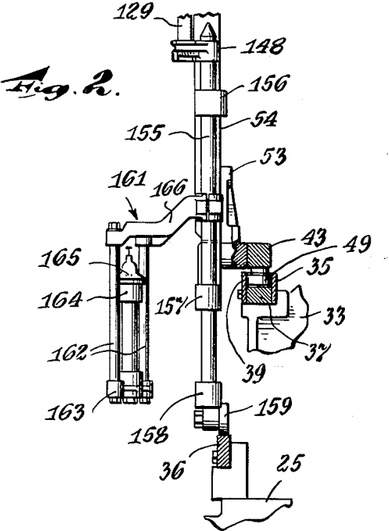
Fig. 2 is a fragmentary sectional view on the line II—II of Fig. 1, in the direction of the arrows.
Figure 3:
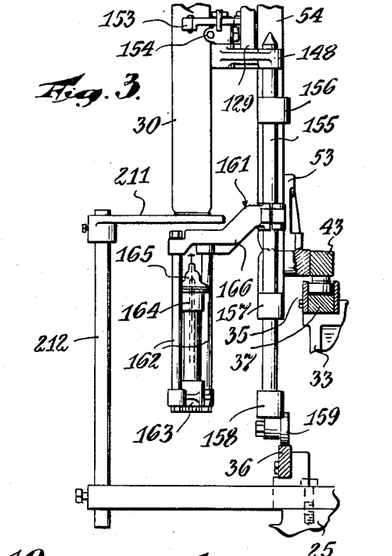
Fig. 3 is a fragmentary sectional view on the line III—III of Fig. 1, in the direction of the arrows.

Referring now to the drawing in detail, like parts being designated by like reference characters, the sealing machine, of the present embodiment of my invention, comprises a base 21 supporting at its front, or right hand end as viewed in Fig. 1, a housing 22, containing the drive mechanism and supporting one end of the framework 23 of the machine, and at its left hand end or back, a housing (not shown) containing the electrical controls. The framework 23 comprises a front (right hand end, as viewed in Fig. 1) pedestal 24 extending from the top wall 25 of the housing 22, and a similar back (left hand end, as viewed in Fig. 1) pedestal (not shown) extending from the top wall of the back housing.

Between the front pedestal 24 and the cooperating back pedestal, extend upper and lower hollow cylindrical frame members 26 and 27. A plurality of generally vertical columns 28 connect intermediate portions of the frame members 26 and 27. Each column 28 is formed with upper laterally extending arms 29 and 31, to end portions of which are secured the upper supporting and guiding track 32, and lower laterally extending arms 33 and 34, to end portions of which are secured the lower guiding track 35, both of said tracks being for the bulb-supporting and guiding of fixtures or heads, and the bulb holder locking and mount elevating cam track 36. Each of the tracks 32 and 35 is channel or U shape in section, and formed by a bottom rectangular section 37, secured to the respective arms, 29, 31, 33, or 34, as by means of bolts 38, and rectangular side sections 39, secured to said bottom section as by bolts 41.

The upper chain 42 and the lower chain 43, forming the tubular bulb conveyor, are each formed of a plurality of elongated links 44. Each link comprises an elongated body portion 45, one end 46 of which is bifurcated to receive the smaller end 47 of the adjacent link. Pins 48, the lower ends of which are provided with rollers 49 guided between the side sections 39 of its track, serve to pivotally connect the links 44 and form the chains 42 and 43. Each upper link also has an outwardly extending pintle 50, on which is mounted a supporting roller 51, which rides on the outer rail of its track 32. The outer end of each pintle or bearing stud fits in a bearing bracket member 52, secured to the respective link 44 as by bolts (not shown) a supporting casting 53 which, together, support, guide, and are connected to and by a channel member 54.

*Drive mechanism*

In order to provide for the synchronous operation of all the mechanism to accomplish the results in accordance with the diagram of Figure 17, a single source of power, such as a motor 55, is provided for driving the mechanism and accomplishing, by means of cams, (1) the indexing, the locking of the mechanism between index cycles, termed "the index control," (2) the oscillation of the burners during sealing, (3) the spreading of the leads, (4) the turning over of the bulb after sealing one end, preparatory to sealing the other end, and the operation of the lock which holds the bulb against turning prior and subsequent to the turning operation.

Figures 12, 13, 14:
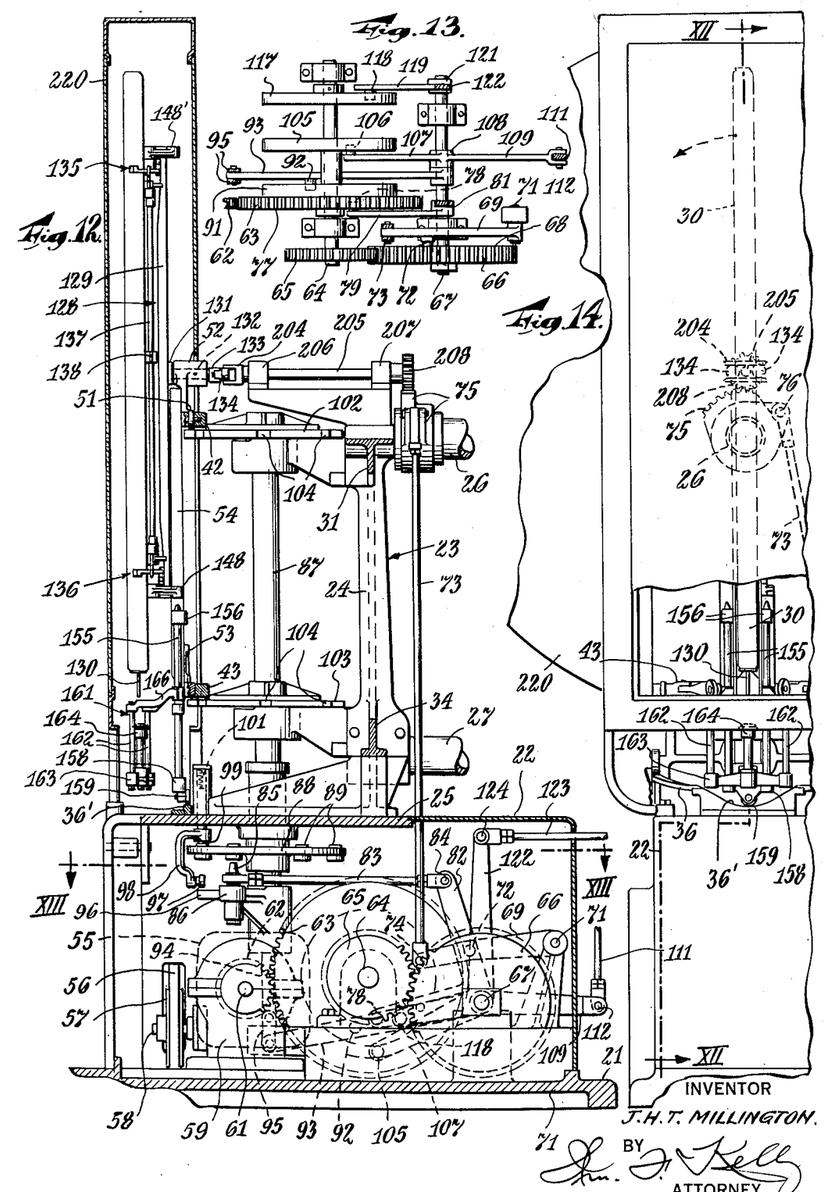
Fig. 12 is a fragmentary longitudinal sectional view of the machine on the line XII—XII of Fig. 1, in the direction of the arrows.
Fig. 13 is a plan view of the cam and rocker shafts, cams and associated elements, on the line XIII—XIII of Fig. 12, in the direction of the arrows.
Fig. 14 is a fragmentary right hand end elevational view of the machine, in the direction of the arrows XIV—XIV of Fig. 1.

As shown most clearly in Figures 12 and 13, the motor 55 is connected by belt 56 to wheel 57, on shaft 58 from reduction gear box 59 and, through gearing therein, drives shaft 61, carrying pinion 62 which meshes with gear 63 on cam shaft 64. The cam shaft 64, in turn, carries gear 65 meshing with gear 66 of double its diameter and floating on rocker shaft 67. A cam 68 is formed on the side of gear 66, which drives bulb turnover lever 69, pivoted to the base of the machine at 71, by engaging a roller 72 carried thereby. The free end of the lever 69 is connected to the lower end of link 73 by pivot pin 74. The upper end of the link 73 is connected to turnover gear segment 75 by pin 76. By virtue of the cam 68 having ½ speed, compared to the remaining cams, the turnover action on the bulb 30 is first one way and then the other, as indicated by the portion of Figure 17 marked "bulb turnover."

The shaft 64 carries an indexing cam 77 disposed within the gear 63 and engaged by a roller 78 on the arm 79 of bell crank lever 81 pivoted on the rocker shaft 67, and with its arm 82 connected to link 83 by pivot pin 84. The other end of the link 83 is connected to pivot member 85 of driving crank 86 rotating on extension of shaft 87. The shaft 87 also carries a driven disc 88, apertured as indicated at 89 to receive the upper end or driving portion of the pivot member 85, when said member is moved upward from the normal position illustrated.

The means for moving the driving extension of the member 85 upward into engagement with the driven disc 88 involves a cam 91 next to the cam 77 on the shaft 64. This cam 91 imparts vertical reciprocatory movement to the crank 86 on the shaft 87 through a roller 92 riding therein and mounted on a lever 93 pivoted on the shaft 67. The free end of the lever 93 is connected to extension 94 on the hub of the crank 86 by means of a link 95, the ends of which are respectively pivoted to the extension 94 and the lever 93.

The cams 77 and 91 are so formed that just before the link 83 is drawn to the right, as viewed in Figure 12, the lever 93 moves the crank 86 upward to cause the pin 85 thereof to be inserted in one of the apertures 89 in the driven disc 88. Simultaneous with this upward movement, the disc portion 96 of the crank 86 engages the roller 97 at the lower end of the lock bracket 98, the upper portion of which carries a bolt 99. The lower end of the bolt 99 between the indexing motions fits in one of the apertures 89 in the drive disc 88. Said bolt 99 is biased downwardly by a coil spring 101.

Therefore, as the link 83 is moved to the right, it pulls the unlocked disc 88 in the same direction, turning it and connected shaft 87 counter-clockwise, and correspondingly turning the sprocket drums 102 and 103 fixed thereon and over which the chains 42 and 43 respectively pass. Their chain rollers 49 are received in notches 104 in said drums, whereby said chains and the parts carried thereby are indexed from one station to the next during one revolution of the cams 77 and 91.

In order to prevent overrunning of the indexing movement, there is desirably provided means for braking the turning movement of the driven disc 88. This braking means may be in the form of a band which is tightened about the periphery of the disc at the end of one indexing movement, and released just prior to the beginning of the next indexing movement. The operation of the brake is indicated by the graph 120 in Figure 17.

The shaft 64 also carries a cam 105 engaging a roller 106 on the arm 107 of bell crank lever 108, pivotally mounted on rocker shaft 67. The other arm 109 of said bell crank lever is connected to link 111 by pivot pin 112. The other end of the link 111 is connected to a crank 113 (Fig. 8), pivoted on a shaft 114 mounted in a bracket 115 on the frame of the machine, by means of a pin 116. The pin 116 connects with mechanism, hereinafter described, for spreading the leads of the lamps being processed.

The shaft 64 also carries a cam 117 engaging a roller 118 on the arm 119 of a bell crank lever 121 pivoted on shaft 67. The other arm 122 of lever 121 is connected to link 123 by pin 124. The other end of the link is pivotally connected by a pin 125 to oscillating lever 126 (Fig. 4) connected to the frame of the machine by pivot pin 127. This lever 126 serves to oscillate the burners in a manner which will subsequently be explained.

Bulb heads or holders

Figures 4, 5, 6:
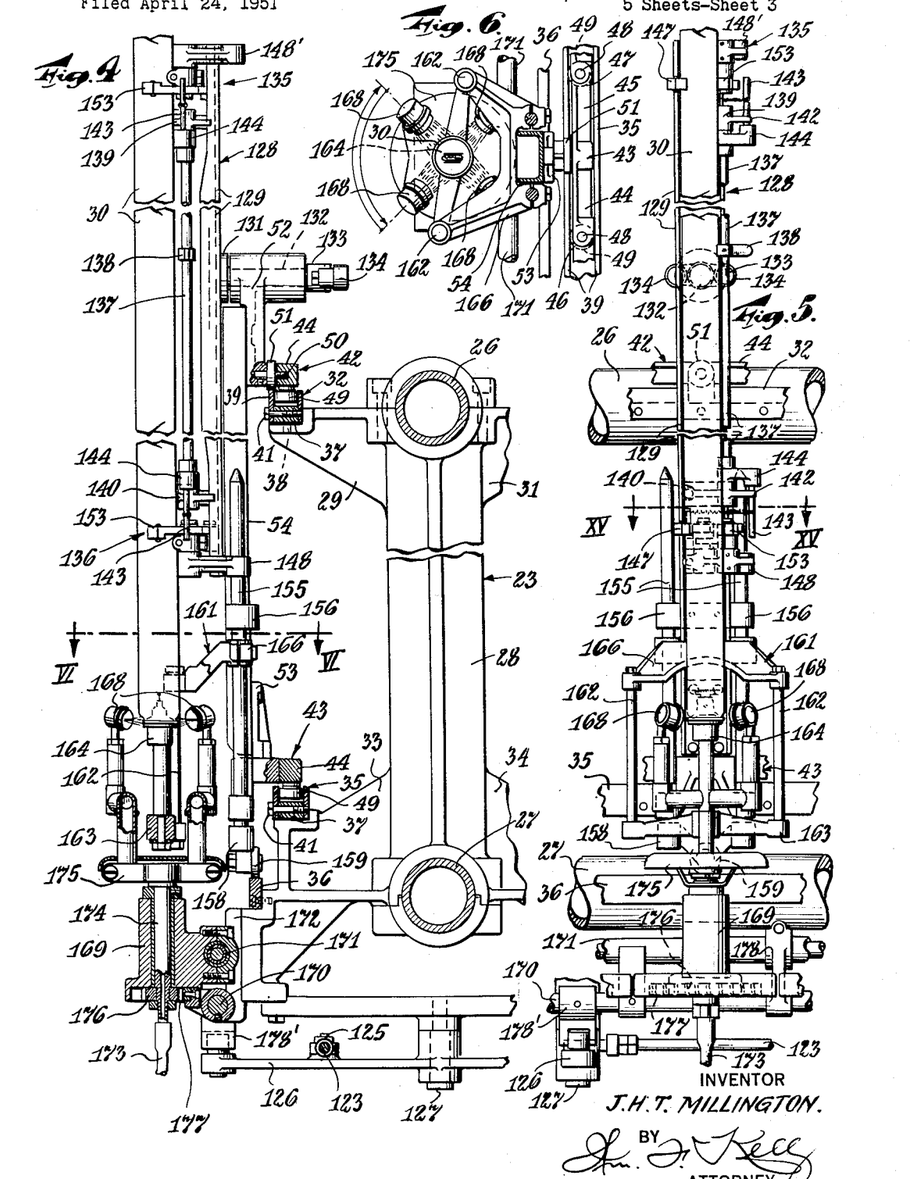
Fig. 4 is a fragmentary sectional view on the line IV—IV of Fig. 1, in the direction of the arrows.
Fig. 5 is a fragmentary elevational view of the machine in the direction of the arrows V—V of Fig. 1.

Each of the series of heads or bulb holders 128 comprises a normally-vertical channel member or slat 129, to the web 131 of which is connected a pintle 132. (Fig. 4 and 12). Each pintle is pivotally mounted in its bearing bracket member 52 and extends therethrough to carry beyond said bearing member a block 133 to which are pivoted two rollers 134.

On the outer or front side, each channel member 129 carries a pair of novel bulb-holding devices 135 and 136, both of which are simultaneously operable by a handle 138 on a normally-vertical rod 137. Each rod 137 is pivotally mounted in its bulb holder brackets 139 and 140 secured to their channel member 129, as by rivet means 141. Each of said bulb holder brackets also carries an extension 142 serving as stops against clockwise movement of spring-carrying rods 143 extending from cranks 144 on said rod 137.

Figure 15:
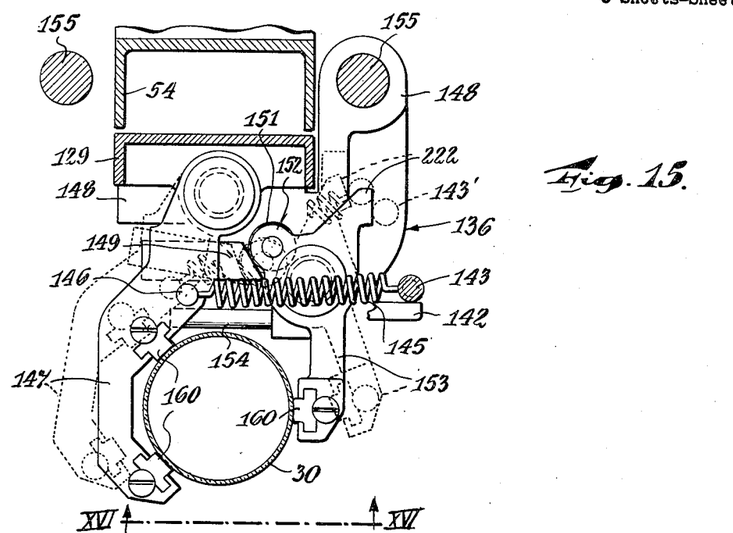
Fig. 15 is a fragmentary sectional view on the line XV—XV of Fig. 5, in the direction of the arrows, and on a larger scale.
Figure 16:
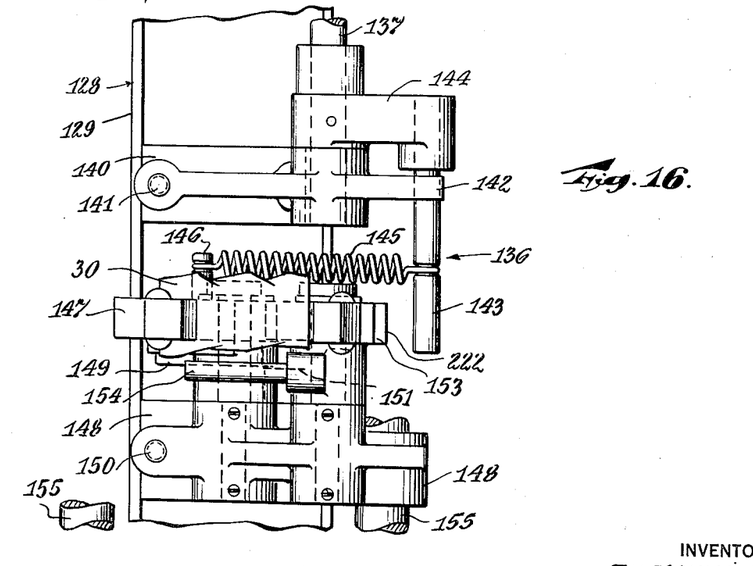
Fig. 16 is a fragmentary side elevational view, in the direction of the arrows XVI—XVI of Fig. 15.

In each bulb-holding device, only one of which is illustrated in detail in Figs. 15 and 16, a spring 145 has one end secured to its rod 143 and the other to a pin 146. The latter extends from its bulb holding V jaw 147, pivoted to its bracket 148, also secured to the channel member 129, as by rivet means 150. Said jaw 147 also carries a cam element 149 normally engaged by a roller 151 pivoted to an extension 152 from a cooperating plain jaw 153, also pivotally mounted on the bracket 148. Said member 153 carries a stop pin 154 engageable by an associated bulb 30 upon moving it to gripping engagement therewith. The jaw 147 carries a pair of transite or similar ceramic insulators 160, while the jaw 153 carries only one of said insulators, for directly engaging a carried lamp bulb 30.

Conventional tubular lamp bulb holders will produce centralizing error of approximately .025" when holding a 1½" diameter bulb which runs .062" oversize or undersize. The holder of the present application reduces this error to approximately .001" under similar circumstances.

A conventional holder supports a bulb between a V jaw and a plain jaw, the jaws being made to move in unison by equal gearing therebetween. When adjusted correctly, the jaws will hold a bulb of one given size centrally. When the jaws are spread slightly to grip an oversized bulb, an error is introduced for two reasons:

1. The arc of movement of the V jaw does not coincide with the plane of bulb location, that is the plane through the line of engagement of the plain jaw therewith and bisecting the angle of the V jaw.

2. A differential motion of the two jaws is required, since the V jaw contacts the bulb at an acute angle to the plane of bulb location, while the plain jaw makes contact normal to the plane of bulb location.

In accordance with my invention, the essentials of the improved design are:

1. A 90° relationship between the plane of bulb location and the plane through the axis of the pivot of the V jaw and the axis of the bulb, so that the arc of movement is tangent to the plane of bulb location at the center of the operating range, hence practically coincident with it for that range.

2. Unequal gearing (equivalent cam 149 and roller 151) to provide a jaw movement ratio equal to the sine of half of the V angle of the jaw. These two features almost exactly correct the errors indicated above over the range of normal bulb diameter variation.

There are three positions of the jaws 147 and 153 which are normally urged together by the spring 145. The first is where the spring center line falls behind or inwardly of the cam roller center line. Here the tension of the spring holds the jaws open, as shown in dotted lines, ready for the reception of a bulb. Opening the jaws is effected by moving the operating handle 138 counterclockwise, as viewed from above. In so doing, the spring-carrying rods 143 engage the tails 222 of the plain jaws 153, causing them to swing counterclockwise to open positions, and carrying with them the V jaws 147 by engagement of their rollers 151 with the cams 149.

The second position is where the jaws are held against the bulb with light pressure, and the spring center line falls only a short distance in front of the cam roller center line. There, the tension of said springs holds the jaws against the bulb. This is an intermediate position, in which the spring pins 143 are in dotted line positions designated 143'. It occurs when a bulb has been pushed to engage the stop pins 154, causing the jaws to automatically come together very lightly, and without damaging force about the bulb.

The third position is where the jaws hold the bulb strongly, exerting relatively-high pressure. Here each spring is in the full-line position in Figure 15, with the spring carrying rods 143 engaging the stops 142. This occurs only when the handle 138 is pulled forward to stretch the springs 145 of both devices 135 and 136 until the rods 143 engage the stops 142.

Locking guide rods and cam track

Each bulb holder 128 is held in vertical position and prevented from turning under normal circumstances by locking rods 155 which slide up and down in bearings 156 and 157 carried by the channel member 54, as actuated by the locking and mount-elevating cam track 36 on which travels a roller 159 pivoted in a casting 158 in which seat the bottom portions of said rods. When the roller 159 engages a relatively high portion of the cam 36, its bulb holder is locked in position, with the ends of the rods 155 received in corresponding apertures in a bulb holder bracket 148 or 148'. When, however, it is time to turn a bulb end for end, in the position shown in Figures 12 and 14, the roller 159 is then in engagement with a depressed portion of the cam track designated 36', so that the rods 155 descend to pass out of engagement with the bracket, thereby permitting the bulb holder and associated bulb to be rotated 180°.

Mount head or fixture

Associated with each bulb holder 128 is a mount head or carriage 161 comprising a pair of normally vertical rods 162 carrying a mount holder base 163 from which extends upwardly a mount support 164, the upper end of which is formed to provide a seat for a mount 165 which is to be connected to an associated bulb 30. The upper ends of the rods 162 are held in a bracket 166, the inner or upper end of which is secured to the locking rods 155. In this way, the cam track 36 serves for both locking and unlocking the bulb holders and simultaneously moving the mounts for sealing to associated bulb and "puddling" the formed seal by virtue of the "hills" 167 found thereon.

Oscillating burners

The burners 168 are rotatably carried on fixtures 169 supported on a hollow shaft or tube 171 extending longitudinally of the machine and secured to the frame thereof by brackets 172. The four burners 168 of each set receive combustible gas, desirably a mixture of fuel gas and air or oxygen respectively received from pipes 209 and 210, through flexible tube 173 connecting with a hollow pivot member 174 extending through the fixture 169 and connecting with a manifold 175. The latter branches upwardly to supply said burners with fuel.

By the disclosed construction, which eliminates any mechanical part interrupting the flames from the burners, it is possible to have each work part stationary during heating and use very short efficient flames which can be controlled so that the area of glass heated is closely restricted. This arrangement not only permits closer head spacing and the making of a seal without distorting the shape of the adjacent bulb shoulder, but avoids maintenance troubles due to rotating valves, permits the use of pre-mixed gases as fuel, and avoids misalignment due to heat warpage.

In order to distribute the heat from the four equally-spaced burners of each unit evenly around the periphery, I have provided means for oscillating said burners approximately 90° about the axis of their pivot member 174. Said means comprises a pinion 176 secured to said pivot member 174, and oscillated by engagement with a reciprocating rack 177. Provision for reciprocation of the racks 177 for the burner sets is effected by mounting them on a reciprocable shaft 170 carried for horizontal sliding movement on tie brackets 178 secured to the tube 171 which supports the fixtures 169. Said shaft 170 carries depending portion 178'.

Movement is transmitted to this portion 178' from the oscillating lever 126 by pivoting thereto the free end thereof. It will thus be seen that as the cam 117 turns, it causes oscillation of the lever 126, short reciprocating movements of the racks 177, and corresponding oscillation of the burners 168 about the vertical axes of their fixtures. Prior to movement of a bulb to the next station, the burners stop oscillating and remain in a position providing clearance for a bulb being processed to pass therebetween.

Lead wire spreading

Figures 8, 10:
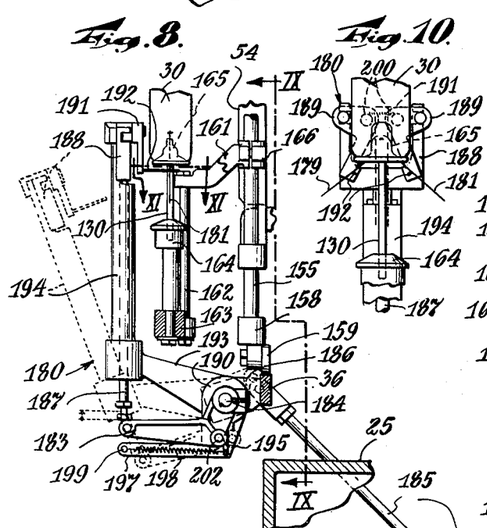
Fig. 8 is a transverse sectional view on the line VIII—VIII of Fig. 1, showing in dotted lines the lead wire spreading mechanism in lower position.
Fig. 10 is a view corresponding with the upper part of Fig. 9 on a larger scale, but showing a succeeding position in which the leads have been spread apart.

After a mount 165 has been sealed to the lower end of an associated bulb, it is desired to spread the leads 179 and 181 thereof from a position where they parallel the associated exhaust tube 130, to a position where they are moved away from said exhaust tube, as shown in Figure 10, so as not to interfere with the subsequent tipping-off of said tube.

Figure 9:
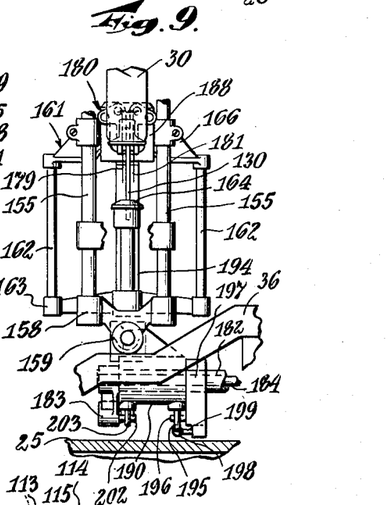
Fig. 9 is a sectional view on the line IX—IX of Fig. 8, in the direction of the arrows.
Figure 11:
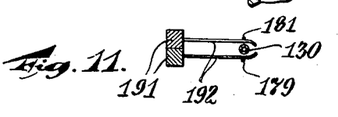
Fig. 11 is a fragmentary sectional view on the line XI—XI of Fig. 8, in the direction of the arrows.

This lead-spreading operation is effected by a device or unit 180, such as is shown in Figures 8, 9 and 10. This device comprises a stationary hollow shaft or tube 182 in which rotates an operating rod 184 carrying a spreader operating arm 183 secured thereto, as by clamping or keying. Said rod 184 is operated from the crank 113 by a connecting rod 185, the ends of which are respectively connected to said crank 113 and a crank 186 secured to said rod 184.

The arm 183 has a roller at its free end engageable with a vertically-reciprocating rod 187, carrying a head 188 at its upper end. To said head 188 are pivoted the short arms 189 of bell crank levers 191. The long arms of said levers carry the lead wire separating fingers 192.

Pivoted on the supporting tube 182 is a hub 190 carrying an arm 193 from the outer end of which extends a hollow column 194 in which the rod 187 is guided. The hub 190 carries a relatively-long pin 195 which, in extreme up position of the arm 193, engages a stop pin 196 on a stationary tube-borne member 197. Said pin 195 is urged into engagement with said stop pin 196 by coil tension spring 198, one end of which is connected to the pin 195, and the other end of which is connected to a pin 199 extending from said stationary member 197.

This means that the arm 193 and its carried column 194 are always resiliently urged to upward or full line position, shown in Figure 8, but are normally held back to dotted-line position by engagement of a stop pin 202 on the arm 183 with a relatively short pin 203 on the hub 190. Thus upward movement of the column carrying arm 193, independently of positive movement of the operating arm 183, is prevented by such stop pin 202 extending from said operating arm 183 and normally engaged by said short pin 203.

When, however, the link 185 is actuated as the operating cam 105 turns, the arm 183 turns clockwise, as viewed in Figure 8, allowing the arm 193 and the column 194 to be moved to full-line position by the spring 198. When it reaches that position, the lead-wire separating fingers 192 lie between the leads 179 and 181. Continued movement of the arm 183 then pushes the rod 187 up through the column 194, causing the bell-crank levers 191 to pivot about their supporting pins 200, which pivot them to the top of the column 194, from a position where their long arms depend vertically, to the position shown in Figure 10 where the members 192 are separated and at the same time separate the leads 179 and 181.

Bulb turning

When a bulb reaches the position shown in Figures 12 and 14, dropping of the lock rods 155 causes them to pass out of engagement with the bracket, 148 or 148' as the case may be. In this position the two rollers 134 have passed into engagement with a U-shaped turning socket 204, mounted on the end of a shaft 205, turnable in bearings 206 and 207 at the top of front pedestal 24. The other end of the shaft 205 carries a pinion 208 meshing with the gear segment 75.

This means that after said unlocking, the gear segment 75 is operated through rod 73 which, in turn, is reciprocated by turning of the cam 68, so that the bulb 30 is turned end for end, that is through 180°, the operator being protected during such movement by cover 220. Further movement results in the roller 159 riding off the depressed portion 36' of the cam track 36 and locking the lamp in reversed position.

Some of the advantages of turning the bulb end for end, as distinguished from previous practice, are labor saving in positioning the bulb for the second seal, and the insuring that the presses of the stems at the ends of the lamp will be in a single plane. The latter requirement is essential for processing the lamp during subsequent operations, such as automatic base threading.

Operation

From the foregoing description of the apparatus for effecting union between a tubular bulb and mounts at opposite ends thereof, it will be seen that said apparatus is adapted to be run, normally, by only two operators, one at the front and one at the back of the machine, as follows:

1. At Station "1" or Station "2," as viewed in Figure 1, the front operator loads a tubulated mount 165 on the support 164 on the mount carriage 161. At this point the cam track 36 is in a low or depressed position.

2. At Station "3" a bulb 30 is pushed in between the holding jaws 147 and 153 against the stop pins 154 on jaws 153 on the supporting slat 129 by the front operator. The elevation of the bulb is determined by stop member 211, adjustably supported on standard 212, extending from the frame of the machine, and which is engaged by the lower end of said bulb.

3. As the loaded bulbs and mounts index from station to station, the cam track 36 elevates the mount carriages between Stations "3" and "5," so that each mount engages the lower end of its bulb at Station "5."

4. Each bulb with its engaged mount passes through the series of sealing fires or burners 168, from Station "6" through Station "19." Stations "6" through "10" serve to soften the engaged portions of the bulb and mount to be connected, while at Stations "11" to "15" inclusive, these members having started to seal together, the incipient joints are puddled, that is worked slightly by moving the mount support up and down by hills 167 on the cam track 36, as shown in Figures 1 and 7.

5. After passing through cooling Station "20," the lead-wires 179 and 181 of each tubulated mount are at Station "21" separated from one another, as shown most clearly in Figure 10.

6. At Station "23," a cam track 36 has dropped away from mount-supporting position, as such support is no longer necessary due to the union of the mount with the bulb, at the same time unlocking the bulb for rotation by withdrawing the locking rods 155 from the bulb holder bracket 148 (or 148'). Engagement of the rollers 134 with the bulb turning socket 204, actuated by cam 68, effects a reversal of the bulb end for end, followed by a reinsertion of the ends only of the locking rods 155 in the bracket at the other end of the bulb holding slat, that is, that numbered 148' (or 148), due to the elevation of the cam 36 at this time being intermediate its high and low points, as viewed on the right side looking at Fig. 14 and as shown schematically in Fig. 1, thus again preventing turning of the bulb and yet leaving sufficient clearance for loading of an untubulated mount.

7. After this, an untubulated mount is loaded on the corresponding support 164 on the carriage 161 at the other side of the machine, at Station "25" or "26" followed by complete insertion of the locking rods 155 in the bracket 148 (or 148').

8. At Station "27," the back operator checks the elevation of the reversed bulb, if necessary, sliding it vertically to match the stop member 221.

9. Sealing of the untubulated mount to the other, but now bottom end of the bulb 30 is effected at Stations "30" through "43." At Station "45" the leads of the untubulated mount are spread as the Station "21" for the tubulated mount.

10. The bulbs 30, each with a mount sealed to each end, are removed one by one by the operator of the next or exhaust machine at a station beyond that numbered "45."

*Figure 17*

Figure 17 graphically indicates the functioning of the machine. In said figure, the curve marked 213 shows that the conveyor is moved intermittently, that is, each lamp is indexed, or moved from one station to the next, and then allowed to remain still while the drive means returns for pulling the conveyor forward a distance equivalent to that from one station to the next.

Graph numbered 214 shows that the indexing movement is effected while the disk portion 96 has pushed up on the roller 97 to effect disengagement of the locking bolt 99 from the driven disk 88. At the end of the indexing movement, the driving crank 86 is disengaged from the driven disk 88 by downward movement of the crank 86, and returned to its former position. The previously-referred-to brake is applied, say to the disk 88, near the end of an indexing movement, and released just before the next indexing movement, as indicated by the graph 120.

The graph 215 shows how the lead spreading device 180 operates. The spreader unit 180 first moves to operating position, with the fingers 192 together or closed, then the fingers open and close, and thereafter the unit is moved out of position.

The graph 216 indicates that the burners 168 oscillate, first one way and then the other, several times at each indexing position. The left-hand end intermediate straight portion of said graph 216 indicates a stationary position of the burners 168 which will not interfere with bulb-indexing movement therebetween. The full line graph 217 and the dotted line graph 218 indicate that one bulb is turned clockwise and the next one counter-clockwise, that is, each succeeding bulb is turned in a direction opposite to that of the preceding one. Graph 219 indicates that the bulb 30 is free of its locking rods 155 while being turned, and is locked prior and subsequent to such turning.

Although a preferred embodiment of my invention has been disclosed, it will be understood that modifications may be made within the spirit and scope of the invention.

I claim:

1. A machine for sealing a tubulated and an untubulated mount to opposite ends of tubular bulbs for fluorescent lamps, comprising means for driving said machine, a conveyor driven by said means and indexing from station to station, fires at certain of said stations for sealing mounts to the lower ends of such bulbs, a series of means on said conveyor each for holding a bulb with its axis vertical, stop means for insuring placement of each bulb at a proper height at the beginning of bulb indexing movement, a corresponding series of carriages each for supporting a tubulated mount and having locking rods receivable in said bulb-holding means and a roller at its lower end, a cam track on which said rollers travel, the elevation of said track varying so as to bring said mounts, after loading on said carriages, up to engagement with the lower ends of supported bulbs at said fires and, after said mounts are sealed thereto, withdraw said carriages at a station beyond where the mounts are sealed to the lower ends of their bulbs, by dropping to also unlock one at a time each bulb-holding member on the conveyor, means at said station for turning said bulbs end for end, said cam beyond said turning position rising to lock each bulb-holding member one at a time in inverted position, and means at the other side of said machine for repeating the bulb-processing operations with untubulated mounts.

2. In a machine for sealing a tubulated and an untubulated mount to opposite ends of a tubular bulb for fluorescent lamps, a conveyor indexing from station to station, said conveyor comprising a plurality of elongated links and connecting pins forming a top chain, a plurality of similarly elongated links and connecting pins forming a bottom chain, each link comprising a body portion, one end of which is relatively large and bifurcated to receive the smaller end of the adjacent link, a track for supporting each chain, rollers on the lower ends of said pins and guided in said tracks, each upper link having an outwardly extending pintle, a supporting roller mounted on said pintle and riding on said upper track, a bearing bracket member receiving the outer end portion of each pintle, means securing each bracket member to its link, a channel member connecting each bracket member to the corresponding lower link, a pair of vertical shafts, upper and lower sprocket drums on said shafts and over which said upper and lower chains respectively travel, means for driving said sprocket drums comprising a cam shaft, a cam carried thereon, a rocker shaft, a bell crank lever pivoted thereon, a roller carried by one arm of said lever and engaging said cam, a link pivotally connected to the other end of said lever and with its other end connected to a pivot member of a driving crank, said driving crank rotating on one of said shafts, a driven disk secured to said shaft and apertured to receive the upper end portion of said pivot member when the latter is moved upwardly from its normal position, means for at needed times moving said pivot member upwardly into engagement with said driven disk comprising another cam on said cam shaft, another lever pivoted on said rocker shaft, a roller carried by said lever and riding on said cam, the free end of said lever being connected to said driving crank for reciprocating it axially of its shaft to carry said pivot member into and out of engagement with said disk, and a locking bolt for said disk also operated by said crank, so that when the disk is being turned said bolt is withdrawn and when the mechanism is being returned for a new indexing movement said bolt holds said disk against rotation.

3. In a machine for sealing a tubulated and an untubulated mount to opposite ends of a tubular bulb for fluorescent lamps, a conveyor indexing from station to station, said conveyor comprising a plurality of elongated links forming a top chain, each link comprising a body portion, one end of which is relatively large and bifurcated to receive the smaller end of the adjacent link, pins connecting said links, a similar bottom chain, a track for supporting each chain, the lower ends of said pins being provided with rollers guided in said tracks, each upper link having an outwardly extending pintle, a supporting roller mounted on said pintle and riding on said upper track, a bearing bracket member receiving the outer end portion of each pintle, means securing each bracket member to its link, a channel member connecting each bracket member to the corresponding lower link, a pair of vertical shafts, and upper and lower sprocket drums fixed on said shafts over which simultaneously said upper and lower chains respectively travel.

4. In a machine for sealing tubulated and untubulated mounts to opposite ends of tubular bulbs for fluorescent lamps, a normally vertical channel member having a pintle secured to its web, a bearing bracket pivotally receiving said pintle, said pintle extending through said bracket and carrying a pair of rollers at its free end, a pair of vertically-spaced bulb-holding devices on the side of each channel member opposite to that from which said pintle extends, both of said devices being operable by a normally-vertical rod carrying a handle, brackets on said channel, said rod being pivotally mounted in said brackets, each bracket carrying an extension, another pair of brackets secured to each channel member, one adjacent to each of said first-mentioned brackets, a bulb-holding V jaw and a cooperating bulb holding plain jaw pivoted to each of said last-mentioned brackets, each V jaw carrying a cam element and each plain jaw carrying a roller on an extension thereof and normally engaging said cam element, each plain jaw also carrying a stop pin engageable by an associated bulb upon moving it into gripping engagement therewith, a crank on each operating rod adjacent each set of bulb holding jaws, a spring-carrying rod extending from each of said cranks, and a spring extending from each of said rods to its V jaw, causing said jaws to come together for holding a lamp bulb, when said bulb is moved therebetween into engagement with the stop pins.

5. In a machine for sealing tubulated and untubulated mounts to opposite ends of tubular bulbs for fluorescent lamps, a normally vertical channel member having a pintle secured to its web, a bearing bracket, means pivotally mounting said pintle in said bracket, said pintle extending through said bracket and carrying a pair of rollers at its free end, and a pair of vertically-spaced bulb-holding devices on the side of each channel member opposite to that from which said pintle extends, both of said devices being operable by a normally-vertical rod carrying a handle.

6. In a machine for processing the bulbs of fluorescent lamps, a normally-vertical channel member, a pair of spaced brackets on said channel member, a bulb-holding V jaw and a cooperating bulb-holding plain jaw, pivoted to each of said brackets, said V jaw carrying a cam element and said plain jaw carrying a roller on an extension thereof and normally engaging said cam element, said plain jaw also carrying a stop pin engageable by an associated bulb upon moving it into gripping engagement therewith, an operating rod also pivoted in said brackets, a handle on said rod for the manual operation thereof, a crank on said operating rod adjacent each set of bulb-holding jaws, a spring carrying rod extending from each of said cranks, each plain jaw having a tail engageable by its rod for opening said jaws, and a spring extending from each of said rods to its V jaw, causing said jaws to come together for holding a lamp bulb when such is moved therebetween into engagement with the stop pins.

7. In a machine for sealing tubulated and untubulated mounts to opposite ends of tubular bulbs for fluorescent lamps, means for driving said machine, a conveyor driven by said means and indexing from station to station, means on said conveyor for holding a series of said bulbs with their axes vertical, a corresponding series of carriages each for supporting a mount and having locking rods receivable in bulb holding means on said conveyor, a roller at the lower end of each carriage, a cam track on which said rollers travel, means for softening adjacent portions of bulbs and mounts so that they seal upon engagement, said track varying in elevation so as to after loading on said carriages bring said mounts to sealing engagement with the lower ends of supported bulbs while holding said locking rods in said bulb holding means and, after said mounts are sealed thereto, withdraw said carriages and said locking rods to permit turning of said bulbs end for end.

8. In a machine for sealing mounts to opposite ends of tubular bulbs for fluorescent lamps, a carriage for transporting such mounts during such sealing operations, said carriage comprising a pair of normally vertical rods, a mount holder base carried by said rods, a mount support extending upwardly from said base and with its upper end formed to provide a seat for a mount, a bracket holding the upper ends of said rods, locking rods to which the upper end of said bracket is secured, a roller carried by said locking rods, and a cam track on which said roller travels for raising and lowering said mount head.

9. In a machine for sealing mounts to opposite ends of tubular bulbs for fluorescent lamps, means for driving said machine, a conveyor driven by said means and indexing from station to station, a series of means on said conveyor each for holding a bulb with its axis vertical, and means at a certain station on said machine for turning each bulb as it is there indexed, end for end, to repeat the processing at the opposite end thereof, said means comprising a carriage, lock rods carried thereby, and a cam on which said carriage rides, said cam dropping at said station to draw said lock rods from locking position, the means for holding each bulb having a pintle pivotally mounted, a pair of rollers carried on the inner end of said pintle, a U-shaped turning socket, a shaft on which said socket is mounted, said rollers coming into engagement with said socket at said turning station, and a pinion on the other end of said shaft, a gear segment meshing with said pinion, and a cam-operated rod connected to said segment, whereby when reaching said station said bulb carrier is unlocked, turned end for end, and relocked in reversed position.

10. A machine for sealing a tubulated and an untubulated mount to opposite ends of tubular bulbs for fluorescent lamps, comprising means for driving said machine, a conveyor driven by said means and indexing from station to station, a series of means on said conveyor each for holding a bulb with its axis vertical, stop means for insuring placement of each bulb at a proper height at the beginning of bulb indexing movement, a corresponding series of carriages each for supporting a mount and having locking rods receivable in said bulb-holding means and a roller at its lower end, burner sets for supplying heat for said sealing, each set comprising a fixture supported on a carrying shaft extending longitudinally of the machine, a manifold, means mounting said manifold, for pivoting in said fixture about a vertical axis, a plurality of burner elements extending upwardly from said manifold, a pinion carried by the mounting means of said manifold, a reciprocable rack engaging said pinion for oscillating said burner elements, means synchronized with the operation of said conveyor for driving said rack, so that it stops oscillating while bulbs are being moved from station to station and thereby avoids interfering with action of the conveyor, a cam track on which said rollers travel, the elevation of said track varying so as to bring said mounts, after loading on said carriages, up to engagement with the lower ends of supported bulbs and, after said mounts are sealed thereto by means of said burner sets withdraw said carriages at a station beyond where the mounts are sealed to the lower ends of their bulbs, by dropping to also unlock one at a time each bulb-holding member on the conveyor, means at said station for turning said bulbs end for end, said cam beyond said turning position rising to lock each bulb-holding member one at a time in inverted position, and means at the other side of said machine for repeating the bulb-processing operations with untubulated mounts.

11. In a machine for sealing a tubulated and an untubulated mount to opposite ends of a tubular bulb for fluorescent lamps, a conveyor indexing from station to station, said conveyor comprising elongated links forming top and bottom chains, each link comprising a body portion, one end of which is relatively large and bifurcated to receive the smaller end of the adjacent link, a track for supporting each chain, pins connecting said links, rollers on the lower ends of said pins and guided in said tracks, each upper link having an outwardly extending pintle, a supporting roller mounted on said pintle and riding on said upper track, a bearing bracket member receiving the outer end portion of each pintle, means securing each bracket member to its link, a channel member connecting each bracket member to the corresponding lower link, a pair of vertical shafts, upper and lower sprocket drums on said shafts and over which said upper and lower chains respectively travel, means for driving said sprocket drums comprising a cam, a pivoted bell crank lever, a roller carried by one arm of said lever and engaging said cam, a driving crank, a pivot member thereon, means connecting the other end of said lever to said pivot member, a driven disk apertured to receive the upper end portion of said pivot member when the latter is moved upwardly from its normal position, means for at needed times moving said pivot member upwardly into engagement with said driven disk, and a locking bolt for said disk also operated by said crank, so that when the disk is being turned said bolt is withdrawn, and when the mechanism is being returned for a new indexing movement, said bolt holds said disk against rotation.

References Cited in the file of this patent

UNITED STATES PATENTS

| | | |
|---|---|---|
| 391,171 | McDonald | Oct. 16, 1888 |
| 1,655,279 | McGowan | Jan. 3, 1928 |
| 1,907,532 | Flaws | May 9, 1933 |
| 1,997,694 | Morick et al. | Apr. 16, 1935 |
| 2,240,093 | Farris | Apr. 29, 1941 |
| 2,256,490 | Paynter | Sept. 23, 1941 |
| 2,262,901 | Murphy | Nov. 18, 1941 |
| 2,428,032 | Moscrip | Sept. 30, 1947 |
| 2,434,664 | Malloy | Jan. 20, 1948 |
| 2,508,979 | Van Gessel | May 23, 1950 |
| 2,512,277 | Jacobsen | June 20, 1950 |
| 2,554,013 | Cooper et al. | May 22, 1951 |
| 2,640,584 | Robb | June 2, 1953 |